W. W. SEAY.
PROCESS OF REFRIGERATION.
APPLICATION FILED MAR. 28, 1905. RENEWED NOV. 13, 1907.
925,039. Patented June 15, 1909.
Refrigerant Indexed
Ammonia absorption system in which Ammonium Sulfo-Cyanide $NH_4CNS$ is used as the absorbent.
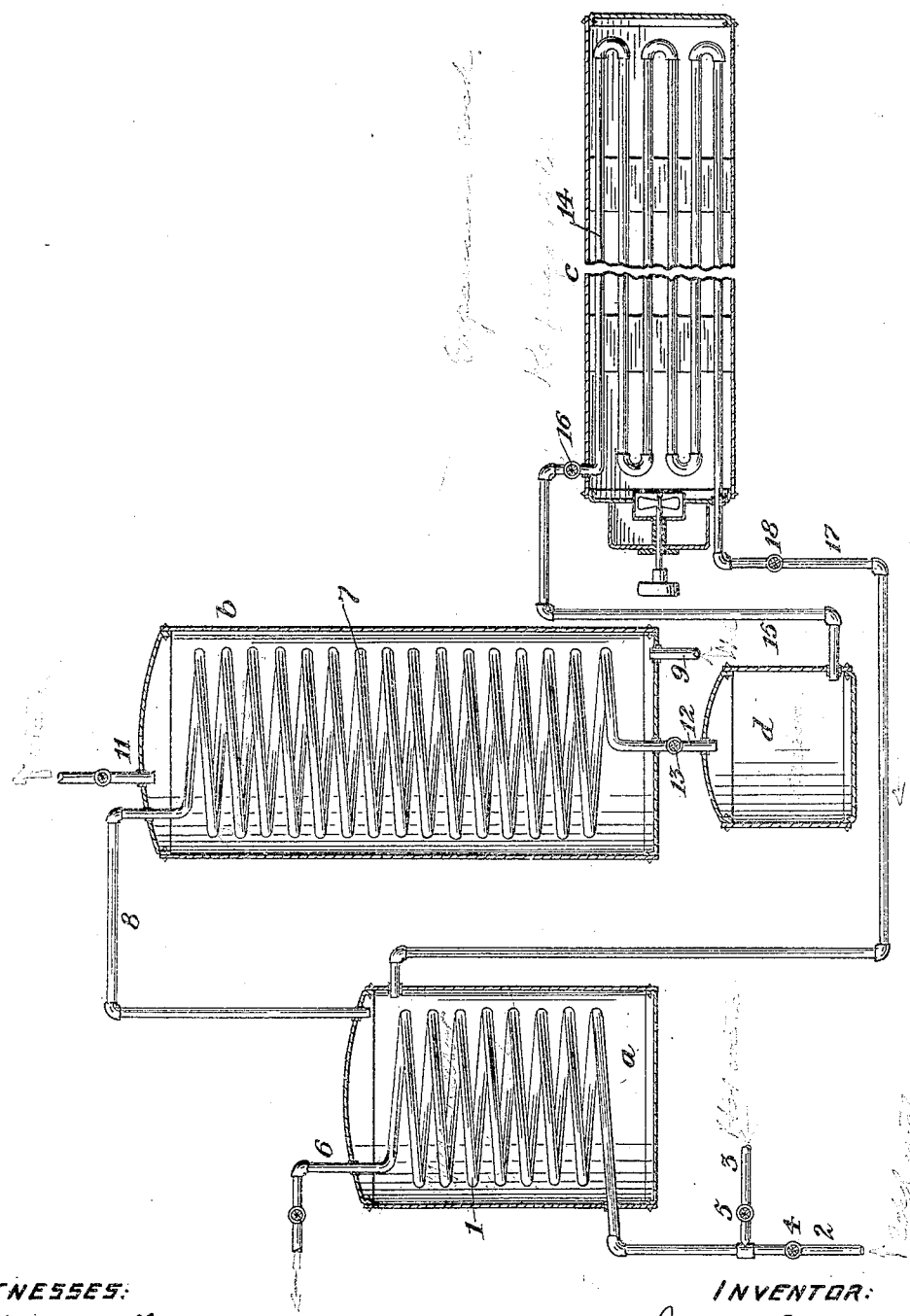
WITNESSES:
Celeste Ansell
John C. Burt
INVENTOR:
William W. Seay,
by Spear & Seely
Attorneys.
German 234,310

UNITED STATES PATENT OFFICE.

WILLIAM W. SEAY, OF SAN FRANCISCO, CALIFORNIA.

PROCESS OF REFRIGERATION.

No. 925,039.     Specification of Letters Patent.     Patented June 15, 1909.

Application filed March 28, 1905, Serial No. 252,571. Renewed November 13, 1907. Serial No. 401,987.

*To all whom it may concern:*

Be it known that I, WILLIAM W. SEAY, citizen of the United States, residing at San Francisco, in the county of San Francisco and State of California, have invented certain new and useful Improvements in Processes of Refrigeration, of which the following is a specification.

My invention relates to the art of refrigeration as employed, for instance, in the production of artificial ice, or artificial cold for use in storage chambers and in the arts.

The objects of the invention are, to reduce the expense of carrying on refrigerating operations, such commercial economy arising from a greatly lessened cost in equipping plants, and in operating them; further to greatly reduce the amount of cooling water, heretofore required for absorption purposes; further, to avoid all losses arising from friction of moving parts; further, to entirely eliminate from the process and apparatus watery vapor which is so prejudicial in the commonly used absorption system; further, to reduce the amount of heat now required in that system for volatilizing ammonia and putting it under pressure for condensation; and finally, and generally, to provide a very cheap, simple and economical process, especially adapted to the operation of very small plants for individual consumers, although capable of being carried out by means of plants designed upon a very much larger scale.

My process is properly classified as belonging to absorption systems of refrigeration, although in comparison with processes coming under the present accepted meaning of the term, it is greatly modified both in principle and in detail.

In order to illustrate a practical manner of carrying out my new process, I have shown in the accompanying drawing a representation of a refrigerating plant, which must be taken as illustrative only of many forms of apparatus by which the process can be carried out; and I have made such illustration as simple as possible in order that a perfect comprehension of my invention can be readily acquired.

It will be understood that I do not limit myself to the particular apparatus shown, or to any special form of apparatus, as the successful operation of my process can be accomplished by other constructions and arrangements involving the general principles herein described.

In the drawing, $a$ is tank, which is both a generator, and absorber. It has an interior coil 1 to which is connected the cold water inlet pipe 2. A hot water branch 3 communicates with pipe 2 and both pipes have cocks 4, 5, so that the supply of either cold or hot water can be cut off. In operation, cold and hot water are used alternately in the absorber, as hereinafter described. A pipe 6 having a stop cock is the outlet for water from the coil 1. The condenser $b$ is a tank having the interior coil 7, which communicates with the absorber by means of the pipe 8. The condenser tank has an inlet pipe 9, and outlet pipe 11 for the condensing water. The condenser coil 7 is connected to the receiver $d$ for liquid anhydrous ammonia by a pipe 12 having a cock 13.

The refrigerator $c$ may be of any desired construction according to its destined employment for making ice or for cooling storage chambers, or use in the art generally. I have shown a casing adapted to be filled with brine and having cans for containing water to be frozen. The refrigerator has an interior coil 14, which is connected to the receiver $d$ by a pipe 15 having an expansion cock 16. Through this pipe the anhydrous liquid ammonia is supplied to the refrigerator. The other end of the coil 14 communicates by a pipe 17 having a cock 18 with the absorber $a$.

The basic principle of my invention involves the employment in the absorber of a solid absorbent which easily combines with liquid anhydrous ammonia, or ammonia vapor, and by such combination becomes liquefied and forms with the ammonia a solution. When this absorbent goes into solution it absorbs a very large proportion of the latent heat of vaporization given off by the ammonia during liquefaction and absorption; and it requires very little cold water in the interior coils to cause such absorption and liquefaction. Conversely very little heat is required to separate and volatilize the ammonia from the solution. There are a number of salts, such as the thiocyanate of ammonium, the nitrate of ammonium, the bromid of ammonium, and the iodid of ammonium, which possess this property of going into solution with ammonia and permitting the ready separation, by vaporization, of such ammonia. In carrying out my process, I cite as an example of such substances and one which I prefer to use, the thiocyanate of ammonium otherwise called the sulfo-cyanid of ammonium $NH_4CNS$ or $NH_4CyS$. Now the smaller the quantity of ammonia and the larger the quantity of the absorbent in proportion, the larger the amount of "latent heat of solution" that will be developed and utilized. If 3 lbs. of the thiocyanate of ammonium be used to one pound of ammonia, for example, the latent heat of solution of the salt, in going into solution, I estimate at more than 250 B. T. U. which will be absorbed by the salt, from the 530 B. T. U. of the latent heat of vaporization given out by the liquefaction of the ammonia; other salts with same properties, may be used similarly and different proportions of all this class of salts relative to the quantity of ammonia may be used, with corresponding different results as to the amount of latent heat of solution developed and utilized.

In some circumstances, when strict economy of heat and "cooling" water is not an important consideration and a large output of refrigeration is desirable, a larger proportion of ammonia relatively to the salt may be used. At lower temperatures or higher pressures very much more ammonia will be liquefied or dissolved by any of the salts mentioned. I have found these salts to be much more difficult to decompose or alter in chemical composition, in an atmosphere of ammonia such as exists in a refrigerating apparatus, by high heat, than when exposed to a corresponding high temperature in the ordinary atmosphere; but the temperature necessary to separate the ammonia from the absorbent is very moderate, as its chemical affinity is such that it requires but little heat to overcome it, in contrast to that of ammonia and water in the regular absorption system, which is represented by the difference between 925 B. T. U. and 530 B. T. U. for separation alone, besides the 530 B. T. U. of latent heat of vaporization.

A lower temperature can be had in the refrigeration coils with my process than any in use, with less expenditure of heat or power, because the ammonia is strictly anhydrous and can be expanded to the lowest limit or "back pressure" at the same cost of operation, as if expanded at a higher pressure. Small plants in my process can be run at a profit, when in other systems it would be a failure in a financial sense.

In commencing operations, a suitable quantity of the absorbent is placed in the absorber, and cold water passed through the absorber coil. A proportionate amount of ammonia either in a liquid anhydrous form or of a vapor is also introduced. The ammonia unites with the absorbent and the two are speedily liquefied and combined in solution the absorbent absorbing a very large proportion of the latent heat from the liquefaction of the ammonia. The cocks 16 and 18 controlling inlet and outlet to and from the refrigerator are at present closed and cock 13 between condenser and receiver is open. The cold water is shut off as soon as liquefaction is complete, and hot water is passed through the absorber coil, the absorber now becoming a generator. Under practical working conditions water at a temperature at or near 212° F. is sufficient. Cold water is also admitted to the condenser coil. The moderate heat applied in the generator will speedily volatilize the ammonia under pressure in the generator and separate it from the absorbent, which, not being volatile will remain in the generator. The ammonia vapor escapes through pipe 8 into the condenser, where it is condensed by cooling water passed over the coils, and as a practically anhydrous liquid passes into the receiver $d$. When all the ammonia vapor has been condensed and liquefied, the cock 13 is closed, the hot water is shut off from the absorber and cold water readmitted thereto. The cocks 16 and 18 are now opened, and the liquid ammonia flows into the refrigerator where it expands into a gas, taking up heat and producing refrigeration. From the refrigerator it passes through pipe 17 back to the absorber, to be again absorbed by the exhausted absorbent in readiness for another similar operation.

Supposing the absorbent before mentioned to be employed its latent heat on going into solution is more than 250 B. T. U. so that only a very small amount of additional heat is required to liberate the ammonia. Thus if I use 3 pounds of the absorbent to 1 pound of ammonia, I estimate that it will absorb more than 250 B. T. U. out of 530 B. T. U. of heat of vaporization of the ammonia; thus leaving only about 280 B. T. U. or less to be carried off by cooling water or to be applied as heat to break up the combination. In the ordinary absorption process it requires in practice considerably more than 925 B. T. U. to liberate one pound of ammonia from its solution in 3 pounds of water, and condense it to a liquid, whose value is only about 500 B. T. U. in the refrigerator; and it is also to be remembered that in the ordinary absorption process the ammonia is accompanied by a certain quantity of watery vapor which materially detracts from its refrigerating capacity.

In my process the amount of heat required to liberate the ammonia from the absorbent is very small and is further reduced by the latent heat of solution of the absorbent so that 300 to 350 B. T. U. at the generator can be made to give about 500 B. T. U. at the refrigerator. Further with a properly ...structed apparatus and under proper precautions in charging it the circulating ammonia is strictly anhydrous.

In the foregoing description I have set forth the alternate uses of the tank $a$ as an absorber and a generator. It is to be noted that if preferred, two similar receptacles having proper water connections with the other parts of the apparatus, can be employed, so that one can be used as an absorber while the other is being employed as a generator and vice versa.

The subject-matter above referred to is involved in a separate application for a patent, Serial No. 470,561, filed January 4, 1909, in which claim is made for the process, and the apparatus above indicated is made the subject-matter of a separate application, Serial No. 401,988, filed November 13, 1907.

By utilizing the latent heat of solution of the absorbent in the absorber, I reduce very greatly the amount of cooling water which is ordinarily required to absorb the vapor of ammonia coming from the refrigerator; and I also greatly reduce the amount of heat required to separate volatilize and put under sufficient pressure for condensation, the ammonia in the absorber, because the heat which has been previously absorbed is given up to the vaporizing ammonia. By using an anhydrous salt as an absorbent for ammonia, I eliminate all water or watery vapor from the process and apparatus. By employing in the absorber a salt which possesses the quality of absorbing ammonia and going into solution with it, I utilize the latent heat of solution of such absorbent, which reduces the "cooling" water required to produce absorption; and from the readiness with which the ammonia separates and volatilizes from such an absorbent, the amount of heat required to produce such separation, and to put the ammonia under pressure for condensation, is very greatly reduced; the heat which has been previously absorbed by the salt on going into solution being given up to the vaporizing ammonia, the chemical affinity between the absorbent and the ammonia being easily overcome by a small amount of heat.

I desire to have it understood that in referring to salts and including in that designation salts of ammonium, I have reference to the strong and close analogy between ammonium and the alkali metals such as potassium, sodium and lithium. Thus an inclusive symbol for all salts termed thiocyanates would be $MSCN$; although for particular reference any element would be specialized under its own symbol, the thiocyanate of potassium for instance becoming $KSCN$ and the thiocyanate of ammonium $NH_4SCN$.

An important feature of this invention is the utilization of the heat units absorbed by the expanded refrigerant gas from the article to be cooled, as an agency in the succeeding steps, of first absorbing the gas into solution with the solid reagent, and then volatilizing the gas from the solution, and expelling it into a condenser. As a gas gives up heat upon liquefaction of the gas, and absorbed by the solution during the process of liquefaction of the solid, conversely, when heat is applied for generation, the heat liberated by the solidification of the reagent from the solution, is taken up by the volatilizing refrigerant gas, so that the expelled gas arrives in the condenser at a temperature and under conditions favorable to condensation. It will thus be seen that the heat subtracted from the article to be cooled is substantially conserved in this system, and hence a very moderate amount of heat is required to volatilize the gas from the solution in the generator, and deliver it into the condenser at the proper temperature for liquefaction.

Another feature of the invention is as follows:—The expanded gas from the refrigerator is, of course, considerable in volume, and it is absorbed and condensed by a relatively small volume of the solid absorber in the relatively small compass of the absorber compartment. When now communication is shut off between the absorber and the refrigerator, and heat is applied to volatilize off the refrigerant gas, it is expelled under considerable compression, sufficient to deliver it in proper condition and temperature into the condenser coil for liquefaction. Therefore, the utilization of this solid absorber in the process of refrigeration, in addition to its functions of conserving the heat from the refrigerator, may be regarded as the equivalent of a mechanical instrument of compression, taking the place in the system of the ordinary pump of the compression system commonly used today.

Another feature of my invention is concerned with the conveyance or circulation of the refrigerant in its cycle through the system by the agency of elemental forces as distinguished from mechanical means. Diagrammatically speaking, the refrigerant may be said to travel in a cycle with a series of stops represented by the different compartments, that is, the reservoir being a starting point from which the liquid flows into the refrigerator, the second stop, where it is converted into a gas. It is then passed to the third stop, which is the absorber or generator tank, in which the gas is converted into a liquid solution, it is then expelled under compression as a gas into the fourth compartment, represented by the condenser coil, where the gas again becomes a liquid, returning to the original reservoir. This circuit is made under the influence of applied elemental forces, heat and cold, and in this manner the refrigerant is bodily conveyed from point to point without mechanical instruments of transference.

Having thus fully described my invention what I claim as new and desire to secure by Letters Patent is:—

1. In the process of refrigeration, the vaporization and separation by heat of ammonia from a liquid which upon the separation of the ammonia is converted into a solid, and the reabsorption of the ammonia with said solid at a reduced temperature, whereby the liquid is reformed.

2. The process of refrigeration, which consists in combining ammonia and a solid absorbent which goes into solution with the same, vaporizing and separating the ammonia from the solution, condensing the vapors so as to produce anhydrous liquid ammonia, vaporizing said anhydrous liquid ammonia to produce a cooling effect and then recombining said ammonia with the exhausted solid absorbent.

3. The process of refrigeration which consists in combining ammonia and a salt of ammonia having the property of going from the solid state into a liquid solution therewith, vaporizing and so separating ammonia from the solution, condensing the vapors so as to produce an anhydrous refrigerant, expanding said refrigerant to produce a cooling effect, and then combining said expanded ammonia gas with the said salt of ammonium from which ammonia vapor has been previously expelled.

4. The process of refrigeration, which consists in expanding the liquid refrigerant in the zone of the article to be cooled, combining the expanded gas and a solid absorbent, both of which go into liquid solution, and then separating the volatile element from the solution by the application of heat, substantially as described.

5. In the art of refrigeration, the process which consists of bringing together a solid absorbent having the properties specified, and a refrigerant gas both becoming liquefied by the contact, whereby heat given off by the liquefaction of the gas is absorbed by the liquefaction of the solid, then applying heat to the solution to volatilize the refrigerant and resolidify the chemical, whereby heat liberated by the solidification of the chemical is absorbed by the volatilizing refrigerant, recondensing the expelled gas by subjecting it to the influence of a condensing medium, and vaporizing the liquid refrigerant in the zone of the matter to be cooled.

6. In the art of refrigeration, the process of circulating the refrigerant through the system which consists in flowing the liquid refrigerant from a reservoir into a communicating compartment and expanding it in the zone of the article to be cooled, flowing the expanded gas into another communicating compartment and absorbing it into solution, with a solid absorbent, volatilizing the gas from the solution into another communicating compartment, condensing the gas into a liquid and flowing it back to the original communicating reservoir, whereby a given charge of the refrigerant is moved from point to point in its cycle solely through the agency of elemental forces, substantially as described.

7. In the art of refrigeration, the process of volatilizing under pressure by the application of heat, ammonia from a liquid solution, the other ingredient of the solution being thereby converted into a solid, and the reabsorption of the expanded ammonia after refrigeration with said solid at a reduced temperature, whereby the solution is reformed, substantially as described.

8. In the art of refrigeration, the process of combining refrigerant gas with an absorbent formed from a chemical having the property of going from a solid state into liquid solution with the refrigerant gas, vaporizing refrigerant gas from said absorbent, and utilizing the separated refrigerant gas to produce a cooling effect.

In testimony whereof I have affixed my signature, in presence of two witnesses, this sixteenth day of March 1905.

W. W. SEAY.

Witnesses:
WARREN S. QUINN,
L. W. SEELY.

See French Patent 327,857 4 July '03, pg 2, ln 81 (1086)